H. C. BENWITZ.
REGULATING VALVE.
APPLICATION FILED JAN. 7, 1908.

928,732.

Patented July 20, 1909.
3 SHEETS—SHEET 1.

WITNESSES
Chas. A. Clark

INVENTOR
Henry C. Benwitz
BY Munn & Co.
ATTORNEYS

H. C. BENWITZ.
REGULATING VALVE.
APPLICATION FILED JAN. 7, 1908.

928,732.

Patented July 20, 1909.
3 SHEETS—SHEET 2.

WITNESSES

INVENTOR
Henry C. Benwitz
BY Munn & Co
ATTORNEYS

H. C. BENWITZ.
REGULATING VALVE.
APPLICATION FILED JAN. 7, 1908.
928,732.
Patented July 20, 1909.
3 SHEETS—SHEET 3.
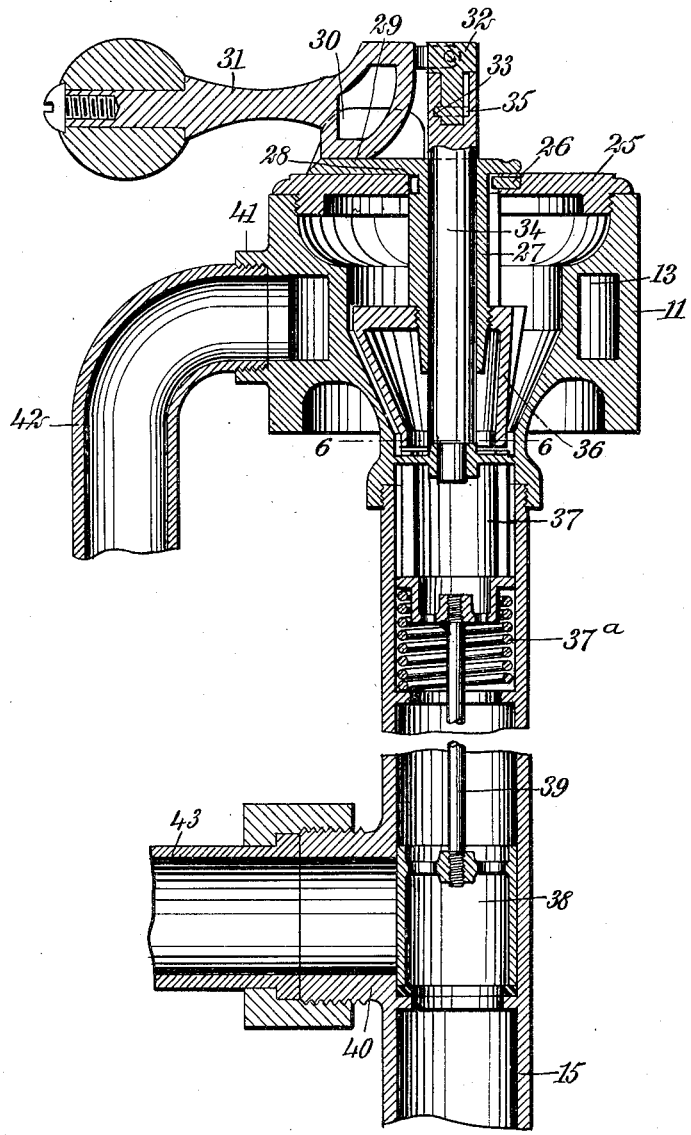
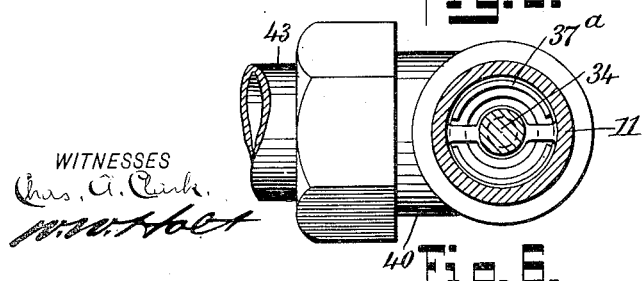
Fig. 5.
Fig. 6.
WITNESSES
INVENTOR
Henry C. Benwitz
BY
ATTORNEYS

UNITED STATES PATENT OFFICE.

HENRY C. BENWITZ, OF CHICAGO, ILLINOIS.

REGULATING-VALVE.

No. 928,732.     Specification of Letters Patent.     Patented July 20, 1909.

Application filed January 7, 1908. Serial No. 409,648.

*To all whom it may concern:*

Be it known that I, HENRY C. BENWITZ, a citizen of the United States, and a resident of Chicago, in the county of Cook and State of Illinois, have invented a new and Improved Regulating-Valve, of which the following is a full, clear, and exact description.

This invention is an improvement in regulating valves for the hot and cold water supplies leading to wash stands, bath tubs and other similar places.

The invention has in view the provision of a valve including an actuating-lever or handle which is operable not only to control both the hot and cold water supplies, but also control the waste or outlet.

The invention further resides in certain special features of construction and combination of parts as will be hereinafter particularly set forth and claimed.

Reference is to be had to the accompanying drawings forming a part of this specification, in which similar characters of reference indicate corresponding parts in all the views.

Figure 1:
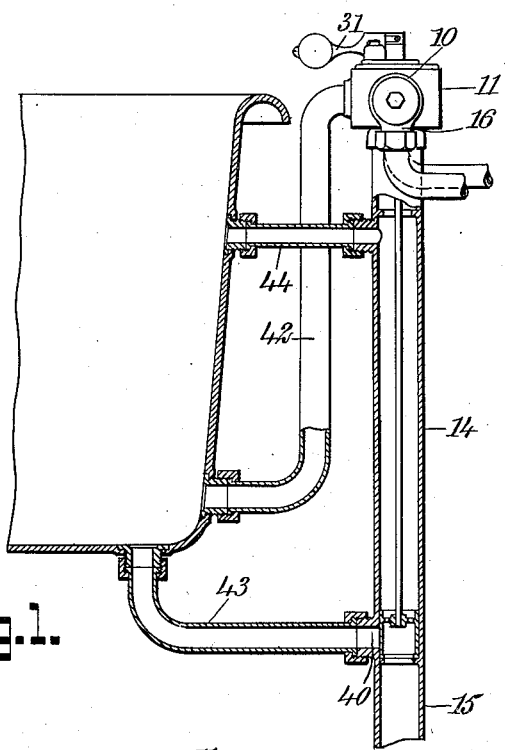
Figure 2:
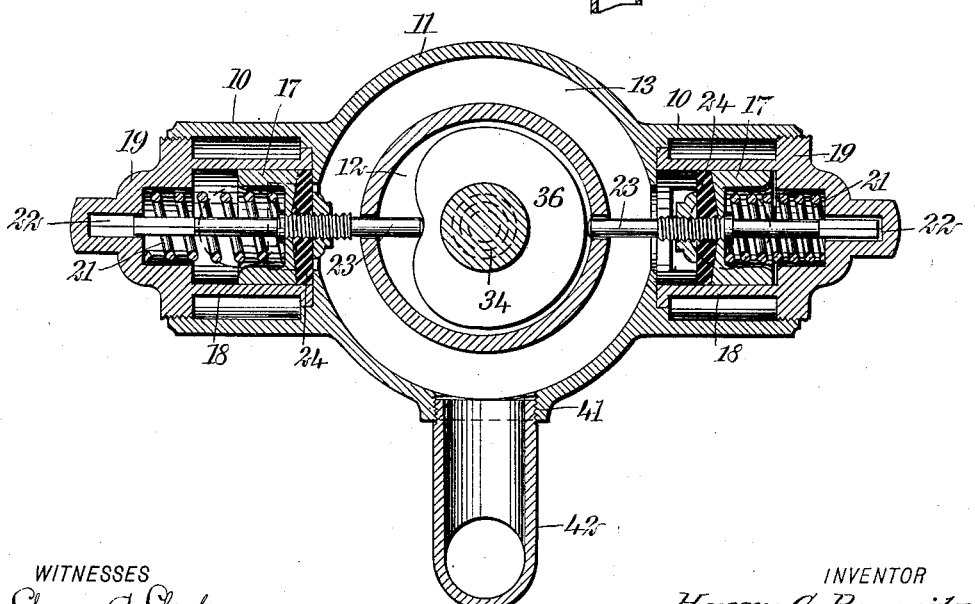
Figure 3:
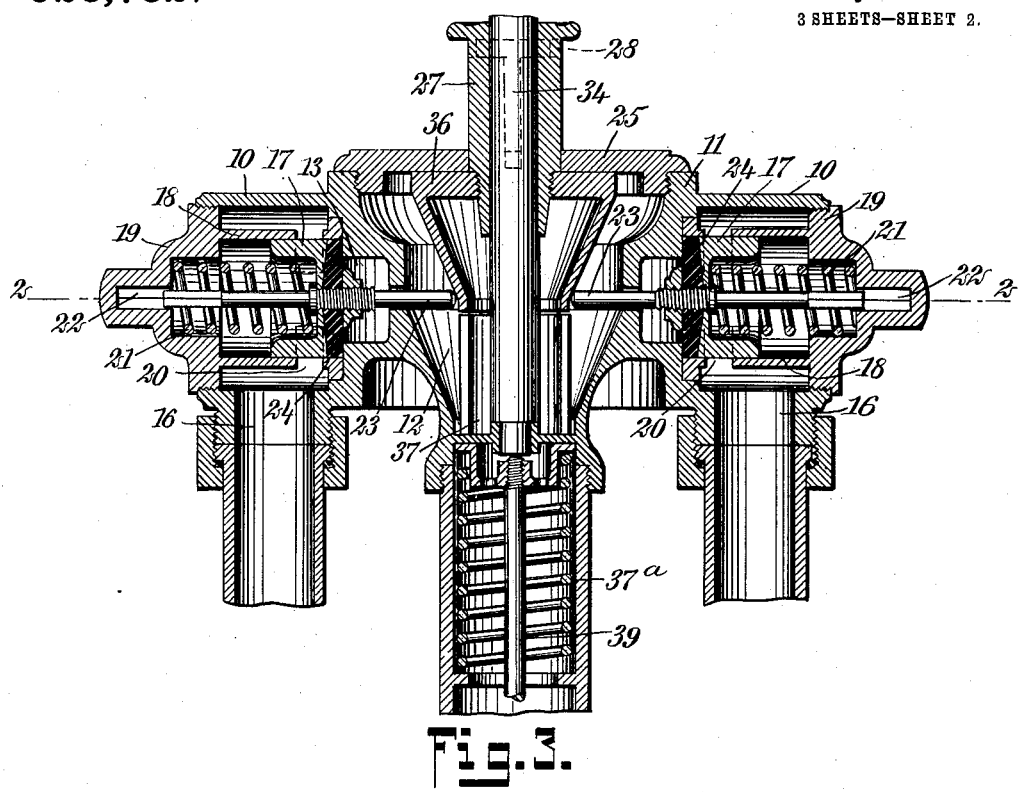
Figure 4:
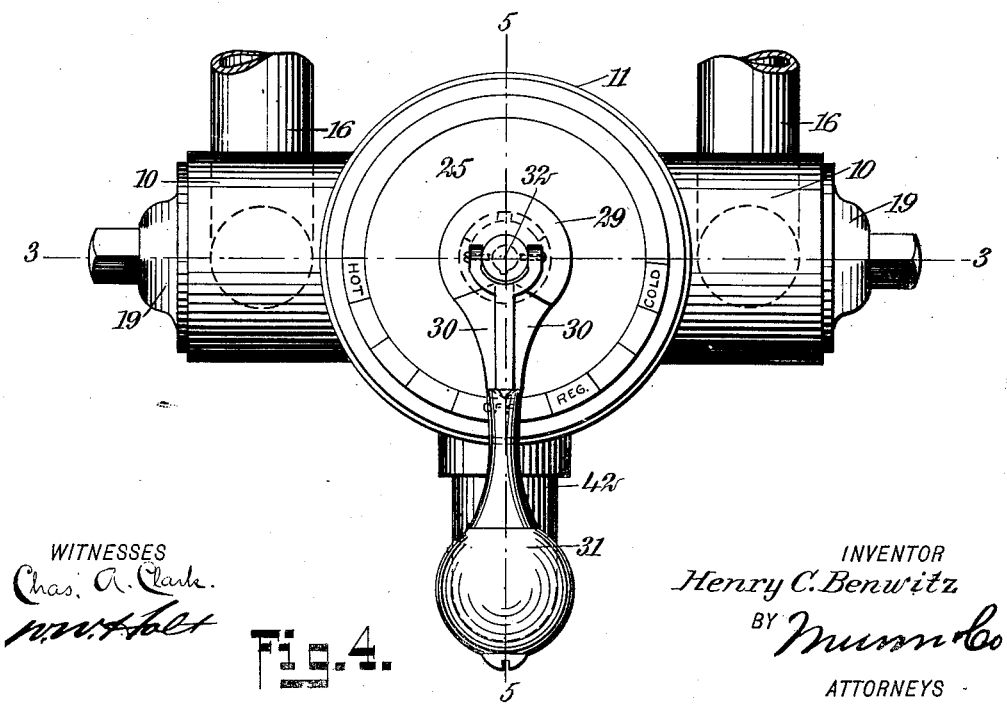

Figure 1 shows in side elevation partly in central section, my improved valve applied to a bath tub; Fig. 2 is a cross-section of the valve on the line 2—2 of Fig. 3 on an enlarged scale; Fig. 3 is a vertical section of the valve on the line 3—3 of Fig. 4; Fig. 4 is a plan of the valve; Fig. 5 is a vertical section of the same on the line 5—5 of Fig. 4; and Fig. 6 is a cross section on the line 6—6 of Fig. 5.

The casing proper of the valve comprises oppositely-disposed valve casings 10, and an intermediate expanded casing 11, the intermediate casing having a chamber 12, which is surrounded by an annular passage 13 and connects at its lower reduced end with an outlet pipe 14, forming, when the valve is applied, a continuation of the waste pipe 15, leading to the sewer.

The valve casings 10 have inlet connections 16 for the attachment of the hot and cold water supplies, and oppositely-disposed valves 17 for controlling the communication between them and the annular passage 13.
Each of these valves is preferably constructed with an inner cylinder 18, in which the head of the valve is slidably mounted. The cylinder 18 is integral or otherwise rigid with a plug 19 threaded into the end of the casing, and forms in connection therewith an annular passage which communicates with the annular passage 13 through suitable openings 20 formed in the cylinder near the valve-head. The cylinder 18, as clearly shown in Figs. 2 and 3, seats in a depression in the side of the casing 11 when the plug 19 is screwed to place, and the said plug is recessed for receiving a spring interposed between it and the valve head, and provided with a bore 22 of reduced diameter for receiving and forming a guide for the valve-stem 23, the said stem passing through the annular passage 13 and through the inner wall thereof into the chamber 12. The valve-head 17 is preferably provided with a rubber or other elastic seating-face 24, to insure a watertight joint between it and the casing 11 when the valve is closed.

The casing 11 is provided with a removable cap 25 covering the chamber 12, and through the center of which is slidably splined by a key 26, a thimble 27, the key being fixed to the cap 25 and adapted to be passed into an annular groove 28 extending about the thimble adjacent to its flanged head 29. This head 29 is adapted to seat directly on the top of the cap 25 when the thimble is depressed, and is provided with spaced ribs or lugs 30 on its upper face, between which is adapted to be engaged the foot of an operating-lever or handle 31, the latter being constructed with a forked inner end, as best shown in Fig. 4, which is pivotally attached at diametrically opposite points to the head of a stud 32, the body of the stud having a projection 33, which, in connection with said body, is adapted to be passed into a slotted recess in the top of a pin 34, and when so inserted, the projection 33 may be engaged in an annular groove 35 in the recess of the pin, and prevent the disengagement of the stud from the pin until the projection is again brought into register with the longitudinal groove.

The lower portion of the thimble 27 is threaded or otherwise suitably fixed to a conical cam 36 located within the chamber 12, and against which the valve-stems 23 bear. The pin 34 passes through this cam, and is fixed within a spider which is rigid with the casing 11. The cylinder 37 is slidably mounted within the neck of the casing 11 and in the outlet pipe 14, and is normally pressed upwardly, tending to elevate the cam and attached mechanism, by a spring 37ª. In order that the cylinder may pass above the spider, in which the pin 34 is nested, it is slotted at each side, as best shown in Fig. 6. The bottom of the cylinder is connected to a cylindrical valve 38 through the intermediary of a stem 39; this last-named valve being also slidably mounted in the outlet pipe 14, and controlling communication between the opening in a discharge connection 40 and the waste pipe 15. The connection of the stem 39 with the cylinders 37 and 38 is preferably made through the intermediary of spiders so that a continuous passage is provided between the chamber 12 and the waste pipe 15, which will admit the flow of such water as leaks into the chamber around the valve-stems 23, directly to the sewer.

The annular chamber 13 has a suitable outlet connection 41, which is designed to be piped to the bath tub, bowl or other similar device, (a bath tub being shown in Fig. 1) the supply pipe 42 leading from said connection into this tub near its bottom. The connections 16 are coupled with the hot and cold water supplies respectively, and the connection 40 is connected with the outlet of the bath tub by a suitable discharge pipe 43. The overflow of the bath tub also connects with the outlet pipe 14 through a pipe 44. With the valve thus installed, on depressing the hand lever 31, both of the valves 17 will be fully opened by the cam 36. Simultaneously with the depression of the lever, the cylindrical valve 38 cuts off the communication between the discharge pipe 43 and the waste pipe, and on the revolution of the cam, the parts are locked against the action of the spring by the projection 26. The operator may then revolve the hand-lever in either direction until water of the desired temperature is obtained. In order that this may be approximately determined, by observing the relative position of the handle, I graduate the cap 25, as illustrated in Fig. 4. By revolving the cam to the position shown in Fig. 2, or to a reversed position, only one of the valves is opened. When the water in the tub or other receptacle reaches the overflow pipe 44, it will pass therethrough and through the outlet pipe 14 and waste pipe 15 to the sewer. The water is cut off by again revolving the hand-lever until the projection 26 registers with the longitudinal groove in the thimble 27, at which time the spring 37ª automatically returns the cam and attached parts to the elevated position illustrated in Fig. 3, and simultaneously therewith opens the passage between the discharge pipe 43 and waste pipe 15, and allows the water to flow from the tub.

The invention as shown and described while being the preferred practical construction of my improved valve may nevertheless be modified in particulars falling within the scope of the appended claims.

Having thus described my invention, I claim as new and desire to secure by Letters Patent:

1. In a device of the character described, a casing having a passage provided with an outlet and inlet and constructed with a chamber separated from said passage, a valve controlling the communication between the inlet and outlet having a stem passing through the passage into the chamber, a waste pipe leading from the chamber and having an opening, a valve movable over the opening in the waste pipe, and means within the chamber and waste pipe for respectively actuating said valve stem and the waste pipe valve.

2. In a device of the character described, two opposed valves, a conical cam longitudinally and revolubly movable for controlling said valves, and means normally forcing said cam in a direction to permit of the closing of the valves.

3. In a device of the character described, two opposed valves, a conical cam longitudinally and revolubly movable for controlling said valves, means normally forcing said cam in a direction to permit of the closing of the valves, and means for locking the cam in a position to open the valves against the tension of the last mentioned means.

4. In a device of the character described, a waste pipe having an opening in the side thereof, a casing having a central chamber in communication with the waste pipe and provided with valve casings having inlets and discharging into a common outlet at the outside of said chamber, valves within said valve casings for controlling the flow through the inlets into the outlet, a valve slidable in the waste pipe over said opening, a device within the chamber revolubly and longitudinally movable for controlling the valves, and means connecting said device with the valve in the outlet pipe, adapting said valve to be longitudinally moved with said device, but permitting of the revolution of said device independent of said valve.

5. The combination of a waste pipe having an opening in the side thereof, a casing connected with the waste pipe having inlets and an outlet, valves for controlling the flow through said inlets to the outlet, a valve slidable in the waste pipe over the opening therein, means within the casing longitudinally movable and revolubly movable independently of said slidable valve for controlling said inlet valves, and a device for actuating both the said means and the said valve.

6. The combination of a casing having an inlet and an outlet, a valve for controlling the flow from the inlet to the outlet, means revolubly and longitudinally movable for controlling the valve, means for locking said first-mentioned means in an operative position, and means for automatically returning the valve-controlling means to inoperative position when the same is unlocked.

7. The combination of a valve casing having an inlet and an outlet, a valve for controlling the flow through the casing from the inlet to the outlet, a thimble slidably splined in one end of the casing and having a head revoluble at the outside of the casing when the thimble is moved inwardly, means carried by the thimble for opening the valve, and means for revolving said head.

8. The combination of a waste pipe having an opening in the side thereof, a valve movable in the waste pipe over said opening, means normally forcing the valve in a direction to provide communication with the waste pipe through the opening, a valve casing having inlets and a common outlet, valves for controlling the flow through the inlets to the outlet, and a device for actuating said valves operable to move the valve in the waste pipe over the opening against the tension of said means.

9. The combination of two valves, a cam longitudinally and revolubly movable for controlling said valves, and means normally forcing the cam in a direction to permit of the closing of the valves.

10. The combination of a casing having inlets and a common outlet, valves for controlling the flow from the inlet through the outlet, a cam longitudinally and revolubly movable for controlling said valves, means normally forcing said cam in a direction to permit of the closing of the valves, and means for locking the cam in operative position against the tension of the last mentioned means.

11. The combination of a casing having an inlet and an outlet, a valve for controlling the flow through the casing from the inlet to the outlet, a removable cap covering the casing, a thimble projecting into the casing through said cap and having a head arranged at the outside of the casing, said thimble having a longitudinal groove and an intersecting annular groove, with the annular groove located adjacent to the head, a key carried by the cap and projecting into one of said grooves, a cam attached to the thimble for opening the valve, and a pin journaled in the thimble having a lever adapted to engage with said head.

12. The combination of a casing having an annular passage, a chamber surrounded by said passage, a waste pipe connecting with the lower end of said chamber having a drain pipe connection, an inlet leading to, and an outlet leading from, said passage, a valve for controlling the flow between the inlet and outlet, a tubular valve slidable in the waste pipe longitudinally thereof and movable over the drain pipe connection, a longitudinally movable cam in the chamber of the casing for opening the inlet valve, and a manually-operated device at the outside of the casing for depressing both the cam and the tubular valve.

In testimony whereof I have signed my name to this specification, in the presence of two subscribing witnesses.

HENRY C. BENWITZ.

Witnesses:
  JOHN W. HEIGH,
  JOSEPH W. SCHULTE.